(12) United States Patent  
Wu

(10) Patent No.: US 8,072,903 B2  
(45) Date of Patent: Dec. 6, 2011

(54) METHODS, SYSTEMS, AND COMPUTER PROGRAM PRODUCTS FOR PERFORMING RANGE-BASED DIRECTORY NUMBER (DN) SCREENING

(75) Inventor: Mitchell Wu, Plano, TX (US)

(73) Assignee: Genband US LLC, Plano, TX (US)

( * ) Notice: Subject to any disclaimer, the term of this patent is extended or adjusted under 35 U.S.C. 154(b) by 1276 days.

(21) Appl. No.: 11/639,445

(22) Filed: Dec. 14, 2006

(65) Prior Publication Data

US 2007/0280466 A1 Dec. 6, 2007

Related U.S. Application Data

(60) Provisional application No. 60/809,447, filed on May 30, 2006.

(51) Int. Cl.
*H04L 12/28* (2006.01)
*H04L 12/56* (2006.01)
*H04J 3/16* (2006.01)
*H04J 3/22* (2006.01)
*H04M 7/00* (2006.01)

(52) U.S. Cl. ... 370/254; 370/392; 370/471; 379/220.01; 379/221.14

(58) Field of Classification Search ............. 379/220.01, 379/221.14; 370/254, 389, 392, 471
See application file for complete search history.

(56) References Cited

U.S. PATENT DOCUMENTS

| 6,587,874 B1 | 7/2003 | Golla et al. | |
| 2001/0025301 A1* | 9/2001 | Anderson | 709/207 |
| 2004/0117410 A1 | 6/2004 | Dietterich et al. | |
| 2004/0199485 A1 | 10/2004 | Caswell | |
| 2004/0242243 A1 | 12/2004 | Luis | |
| 2005/0185785 A1 | 8/2005 | Latter et al. | |
| 2006/0041526 A1* | 2/2006 | Cline | 707/1 |
| 2006/0099974 A1 | 5/2006 | Contractor | |
| 2006/0111112 A1 | 5/2006 | Maveddat | |
| 2006/0129569 A1 | 6/2006 | Dieberger et al. | |
| 2007/0203909 A1* | 8/2007 | Marathe | 707/7 |

OTHER PUBLICATIONS

Notification of Transmittal of the International Search Report and the Written Opinion of the International Searching Authority, or the Declaration for International Application No. PCT/US07/12732 (Dec. 7, 2007).

Chinese First Official Action for Chinese Patent Application No. 200780028599.8 (May 19, 2011).

(Continued)

*Primary Examiner* — Ronald Abelson
(74) *Attorney, Agent, or Firm* — Jenkins, Wilson, Taylor & Hunt, P.A.

(57) ABSTRACT

Methods, systems, and computer program products for performing range-based directory number (DN) screening are disclosed. According to one aspect, the subject matter described herein includes a method for determining that a telecommunications device DN is within an allowed set of numerical ranges. The method includes creating a range tree for representing an allowed set of numerical DN ranges, wherein each range is defined by a numerical upper and lower bound, and storing the range tree in a memory device; receiving a telecommunications device DN to be analyzed; traversing the range tree from a root node of the tree, based on analyzing each digit of the DN, until a leaf node is reached; and determining, based on an attribute associated with the leaf node reached, whether the DN is within the allowed set of ranges.

20 Claims, 5 Drawing Sheets

OTHER PUBLICATIONS

Communication of European publication number and information on the application of Article 67(3) EPC for European application No. 07795485.7 (Feb. 11, 2009).

Notification Concerning transmittal of International Preliminary Report on Patentability for International Application No. PCT/US07/12732 (Dec. 18, 2008).

* cited by examiner

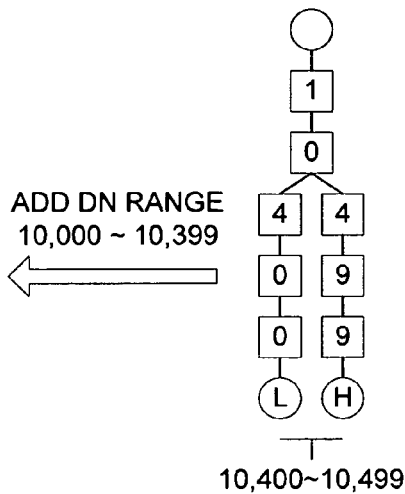
ADD DN RANGE
10,000 ~ 10,399
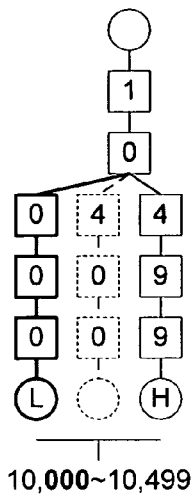
10,000~10,499
FIG. 4B
10,400~10,499
FIG. 4A
ADD DN RANGE
10,500 ~ 39,999
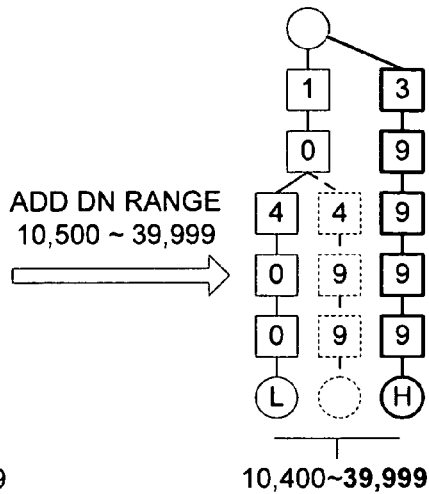
10,400~39,999
FIG. 4C
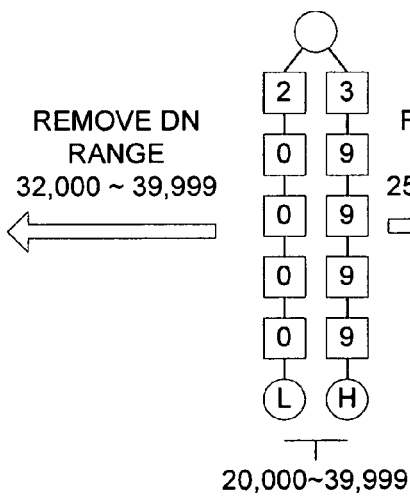
REMOVE DN
RANGE
32,000 ~ 39,999
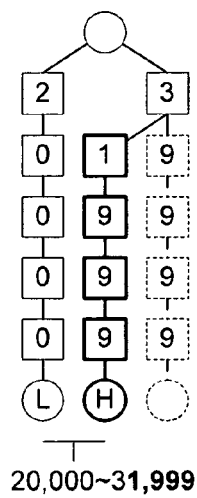
20,000~31,999
FIG. 4E
20,000~39,999
FIG. 4D
REMOVE DN
RANGE
25,000 ~ 27,999
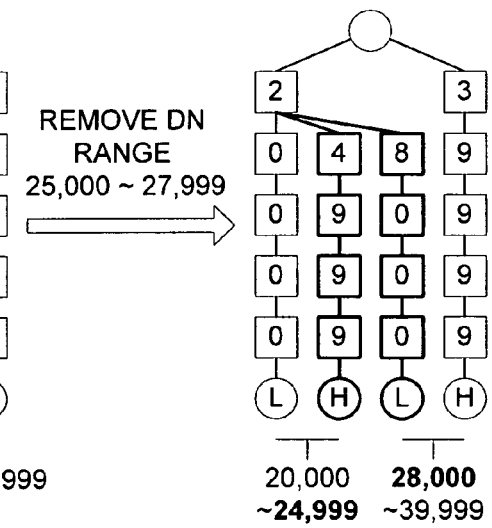
20,000   28,000
~24,999 ~39,999
FIG. 4F

US 8,072,903 B2

METHODS, SYSTEMS, AND COMPUTER PROGRAM PRODUCTS FOR PERFORMING RANGE-BASED DIRECTORY NUMBER (DN) SCREENING

RELATED APPLICATIONS

The presently disclosed subject matter claims the benefit of U.S. Provisional Patent Application Ser. No. 60/809,447, filed May 30, 2006; the disclosure of which is incorporated herein by reference in its entirety.

TECHNICAL FIELD

The subject matter described herein relates to methods and systems for directory number (DN) analysis and call routing. More particularly, the subject matter described herein relates to methods, systems, and computer program products for performing range-based directory number (DN) screening.

BACKGROUND

Directory number (DN) analysis and screening is a mandatory step in routing a call through a digital switch, such as a soft switch. DN screening determines whether a received DN belongs to the domain of a digital switch and thus determines how the switch will process the DN.

DN analysis typically includes the following steps: DN screening, which determines whether the directory number belongs to the domain serviced by the switch; digit analysis, which analyzes the received digits and processes the call based on the results of the analysis; and routing analysis, which determines the route to be taken by the call based on the results of the digit analysis. The DN screening step traditionally involves performing either a database query or a prefix pattern match.

The database approach typically involves storing in a database each number in the domain of the switch. During operation, a database access is made for each DN that is screened. Although this is an easy method to implement, the database access may incur significant processing overhead at every switch, due to the fact that a database access or query is performed for every DN; this additional overhead may degrade overall performance of the switch and may thus cause an unacceptable loss of capacity during peak traffic. The screening of a large number of DNs may become a significant bottleneck of a digital switch; in extreme cases, calls may be dropped or routed to other switches if a switch has exhausted its resources during the DN screening phase.

The prefix pattern match approach typically involves creating a table that stores a list of every prefix within the domain. For 10-digit numbering plans the prefix may be the most significant 7 digits of the DN, reflecting the fact that telephone numbers may be assigned to operators in blocks of 1,000 numbers. If operator A has been assigned a single block of 1,000 DNs, from 919.493.8000 through 919.493.8999, for example, a switch owned by operator A need only check only a single prefix (i.e., "9194938") to determine if the number is within the assigned block. In this example, the table of prefixes contained within the domain would include just one entry: [9194938]. A prefix pattern match could be achieved with a single comparison. However, the prefix table for a switch with a domain containing telephone numbers 214.222.2000 through 310.999.9000 would contain 967,778 prefixes: [2142222, 2142223, 2142224 . . . , 3109997, 3109998, 3109999], where each prefix represents a block of 1,000 DNs. The prefix pattern match method also has some distinct disadvantages. First, this approach is not scalable to handle blocks of numbers with the same property that do not share a prefix. Although there are mathematic and other techniques, such as the use of parse trees, that avoid the necessity of performing the above-described prefix comparisons to perform a prefix pattern match, one problem is that for optimum speed, the entire table or tree should be in memory. Due to the size of the table and limitations on memory resources, however, it may be impossible or prohibitively costly to keep the entire table or tree in memory. Second, if a database is used to store prefixes rather than storing the full DN, although the prefix pattern match approach may reduce by a factor of 1000 the number of entries that must be stored and compared, that number may still be large enough to cause performance of the switch to suffer due to the overhead incurred by database access and processing. Third, if a parse tree is used to store prefixes, although the use of such a tree has the benefit of fast number lookup (at the expense of potentially enormous memory requirements, as mentioned above), the maintenance of parse trees—adding and deleting blocks of numbers—may be very resource intensive and thus costly, and may require multiple traversals of the entire tree. In situations where the numbers associated with the domain of a particular switch change relatively often, the additional overhead incurred to continuously maintain the tree may cause performance of the switch to suffer unacceptably.

Accordingly, in light of these disadvantages associated with database lookup and prefix pattern-matching methods of DN screening, there exists a need for a way to perform DN screening that is fast, uses minimal processing and memory resources, and is easily and quickly maintained.

SUMMARY

According to one aspect, the subject matter described herein includes a method for determining that a telecommunications device directory number (DN) is within an allowed set of numerical ranges. The method includes creating a range tree for representing an allowed set of numerical DN ranges, wherein each range is defined by a numerical upper and lower bound, and storing the range tree in a memory device; receiving a telecommunications device DN to be analyzed; traversing the range tree from a root node of the tree, based on analyzing each digit of the DN, until a leaf node is reached; and determining, based on an attribute associated with the leaf node reached, whether the DN is within the allowed set of ranges.

According to another aspect, the subject matter described herein includes a method for creating a range tree of telecommunication device directory numbers. The method includes creating a root node and encoding at least one pair of numbers representing a numeric upper and lower bound of an allowed directory number range, wherein encoding each number N of the pair of numbers includes setting a node pointer P to point to the root node, and for each digit D of N, starting from a most significant digit of N: determining whether there exists a node C that is a child of the node pointed to by P and that contains a value of the digit D, and responsive to determining that such a node C does not exist, creating a node C that is a child of the node pointed to by P and that contains the value of the digit D; moving P to point to the node C; and associating with the node pointed to by P an attribute for indicating whether the number N represents an upper bound or a lower bound of an allowed directory number range.

According to another aspect, the subject matter described herein includes a range tree embodied in a computer-readable medium for representing an allowed set of telecommunication device directory number (DN) ranges. The range tree comprises a root node and a plurality of nodes subtending from the root node for representing digits of telecommunications device directory numbers, the nodes being grouped to represent ranges to telecommunications networks directory numbers and for each range, the nodes represent a number comprising a lower bound for the range and a number comprising an upper bound for the range.

According to another aspect, the subject matter described herein includes a system for determining that a telecommunications device directory number (DN) is within an allowed set of ranges. The system includes a telecommunications switch for receiving a call including a DN. The switch includes a range tree embodied in a computer readable medium, the range tree including a root node and a plurality of nodes subtending from the root node for representing digits of telecommunications device directory numbers, the nodes being grouped to represent ranges to telecommunications networks directory numbers and for reach range, the nodes represent a number comprising a lower bound for the range and a number comprising an upper bound for the range. The switch also includes a lookup engine for receiving a DN and for performing a lookup to determine whether the DN is within an allowed range, where the switch processes the call based on results of the determination.

The subject matter described herein for performing a range-based directory number screening may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 4A is a block diagram illustrating an exemplary simplified range tree according to an embodiment of the subject matter described herein;

FIG. 4B is a block diagram illustrating a change made to the range tree of FIG. 4A in response to a request to allow additional DNs according to an embodiment of the subject matter described herein;

FIG. 4C is a block diagram illustrating another change made to the range tree of FIG. 4A in response to a request to allow additional DNs according to an embodiment of the subject matter described herein;

FIG. 4D is a block diagram illustrating another exemplary simplified range tree according to an embodiment of the subject matter described herein;

FIG. 4E is a block diagram illustrating a change made to the range tree of FIG. 4D in response to a request to remove DNs from the allowed subset of ranges according to an embodiment of the subject matter described herein;

FIG. 4F is a block diagram illustrating another change made to the range tree of FIG. 4D in response to a request to remove DNs from the allowed subset of ranges according to an embodiment of the subject matter described herein;

DETAILED DESCRIPTION

In accordance with the subject matter disclosed herein, methods, systems, and computer program products are provided for range-based directory number (DN) screening. To determine whether a DN is included in the blocks of DNs processed by a particular switch, the range of DNs to be processed is represented by a compact range tree preloaded in memory, and an algorithm is used to quickly traverse the range tree and report whether or not the DN being analyzed is within an allowed range. The range tree is fast and deterministic, producing a result in a small, fixed number of operations, yet has a resource footprint small enough to be cached in memory for an additional speed improvement. The range tree easily supports multiple ranges as well as ranges of varying size. The range tree may be easily and quickly updated during maintenance.

Range Tree Structure

Figure 1:
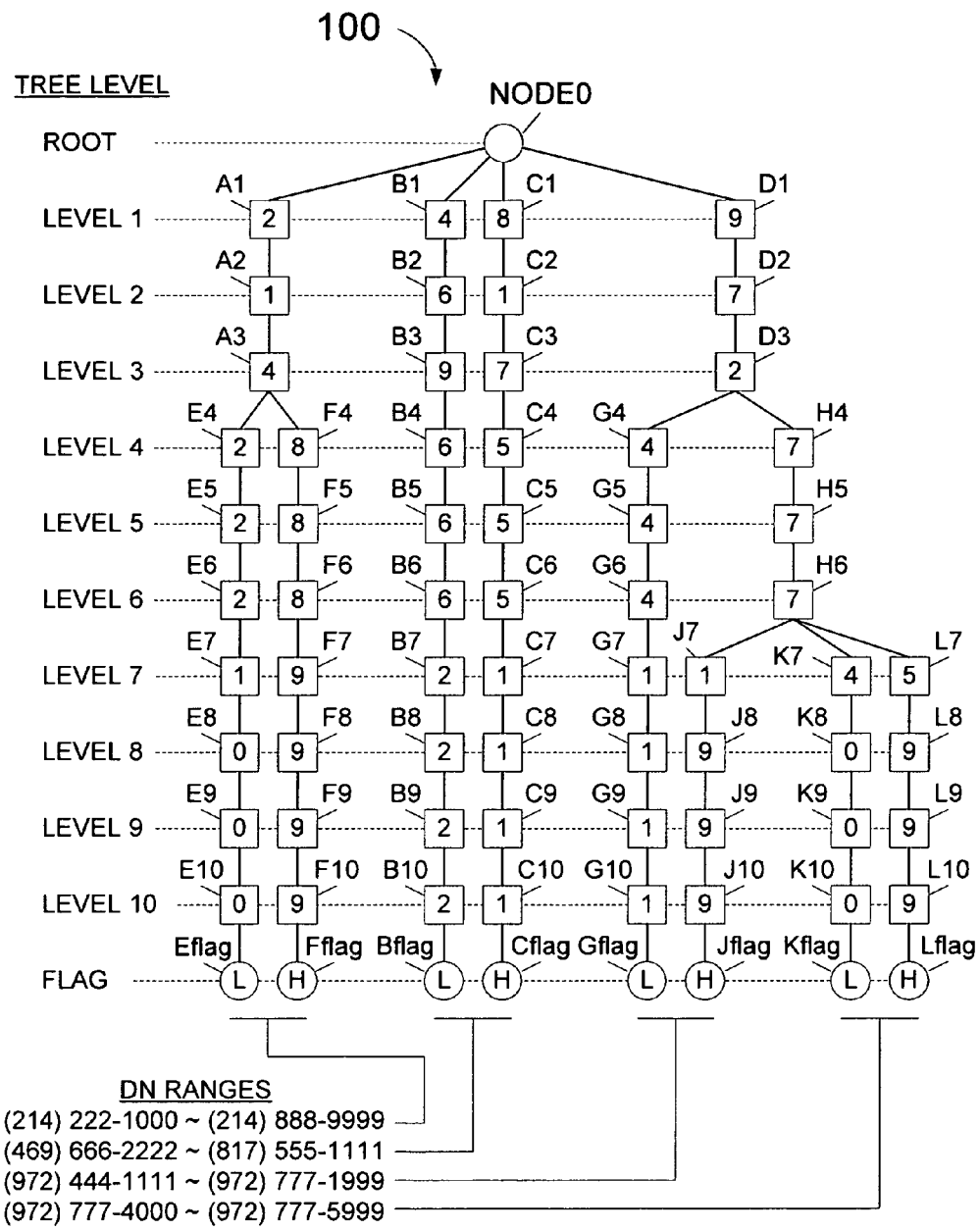
FIG. 1 is a block diagram illustrating an exemplary range tree according to an embodiment of the subject matter described herein.

FIG. 1 is a block diagram illustrating an exemplary range tree according to an embodiment of the subject matter described herein. In this embodiment, the structure of a range tree 100 includes a root node (NODE0), child nodes (e.g., nodes A1~A3, E4~E10, F4~F10, etc.) indicated by square boxes, and leaf nodes—a child node that has no child node of its own—indicated by circles. The root node is the parent node for the entire range tree 100. NODE0 may have one or more child nodes. The children of NODE0 are referred to as Level 1 nodes. The children of Level 1 nodes are referred to as Level 2 nodes; the children of Level 2 nodes are referred to as Level 3 nodes, and so on. In other words, children of a Level N node will be Level N+1 nodes. A child node may store a digit value corresponding to one digit in a number or digit string that represents an upper or lower bound of a range represented by range tree 100, a flag value that indicates whether the digit string indicates the upper or the lower bound of the range, or both. Typically, the flag value is associated with a leaf node: in embodiments where each leaf node stores a flag value but no digit value, the leaf node may also be referred to as a "flag node" or a "flag level" node; in embodiments where each leaf node stores a digit value, there may be a flag attribute associated with the leaf node, such as a field in the node data structure, that holds the flag value.

The children of a parent node are commonly referred to as the branches of the parent node. Thus, a parent with three children is said to have three branches: each child (and that child's children) constitute one branch. In FIG. 1, each branch is identified by a letter (i.e., A, B, C, etc.), and each node is identified by a combination of the branch identifier and the level number. Thus, NODE0 has four branches, A, B, C, and D; consequently, NODE0's children are given the identifiers A1, B1, C1, and D1. Node A1 has only one child, and so continues the A branch. Node A1's child is a level 2 node and so may be given the identifier A2. Node A2's only child is a level 3 node continuing branch A and thus may be given the identifier A3. Since node A3 has two children, however, two new branches, E and F, are created, and A3's level 4 children may be identified as E4 and F4, respectively. The remaining nodes in FIG. 1 are similarly identified. Thus, node L9 corresponds to a level 9 node in the L branch. It should be noted that the node identifiers used in FIG. 1 are for convenience of description only; it is not necessary that each node be so identified for proper operation of range-based DN lookup.

Range tree 100 will typically have as many levels as there are digits to be analyzed in an incoming DN, plus a flag level if the embodiment uses flag nodes. DNs that comply with the North American Numbering Plan (NANP), for example, may have 10 digits, and a range tree that processes NANP-compliant DNs will have 10 levels plus the flag level if used. For ease of explanation, all DN are assumed to have the same length. However, for systems that allow DNs of varying length, for example, multiple trees may be used, where each tree stores DNs of a particular length. Multiple trees may be processed in parallel for speed, where a DN may be considered valid if any range tree returns a "DN is within a valid range" indicator, for example.

In the embodiment of a range tree shown in FIG. 1, range tree 100 encodes four distinct ranges of DNs:

| Range | Lower Bound - "L" | | Upper Bound - "H" |
|---|---|---|---|
| 1 | (214) 222-1000 | ~ | (214) 999-9999 |
| 2 | (469) 666-2222 | ~ | (817) 555-1111 |
| 3 | (972) 444-1111 | ~ | (972) 777-1999 |
| 4 | (972) 777-4000 | ~ | (972) 777-5999 |

In one implementation of the tree, the ranges may be non-overlapping. Any range may be broken down into smaller, non-overlapping blocks. The lower bound of Range 1 is represented by the nodes A1, A2, A3, E4, E5, E6, E7, E8, E9, E10, and Eflag; the values stored in those nodes are, in order, "2-1-4-2-2-2-1-0-0-0-L". The flag node Eflag contains the value "L", which indicates that this set of nodes represents the lower bound of an allowed range. The upper bound of Range 1 is represented by the nodes A1, A2, A3, F4, F5, F6, F7, F8, F9, F10, and Fflag; the values stored in those nodes are, in order, "2-14-9-9-9-9-9-9-9-H". The flag node Fflag contains the value "H", which indicates that this set of nodes represents the upper bound of an allowed range. The other ranges are similarly encoded into range tree 100.

Range Tree Search

A DN may be made up of one or more digits. A NANP-complaint DN for example is typically made up of 10 digits. In a range-based search, a DN is evaluated digit by digit starting from the most significant digit, and the range tree may be traversed accordingly. As used herein, "D" refers to the digit currently being analyzed. For convenience of description, a node pointer "N" is considered to be conceptually jumping from node to node as the tree is traversed. Except for the leaf nodes, every node has at least one child node associated with it. As used herein, "C" refers to a child node that stores a particular value. For shorthand purposes, C may also be used to refer to the value itself that is stored by the child node.

Simply put, traversal of the range tree involves determining whether the current node has any children, determining the values contained in or stored by the children, and determining which child to jump to next based on whether or not the value of a child node matches the value of the current digit D. Broadly speaking, the algorithm has four stages:

STAGE 1: Perform longest pattern matching. If one path is found and exactly matched all the way down to a leaf node, then this DN is in an allowed range. If there is only a partial match, match for as many digits of the DN as possible, then go to Stage 2. If there is no match (i.e., no child of the root node contains a value equal to the most significant digit of the DN), go to Stage 3.

STAGE 2: Check the last matched node: if there is a child of this node whose node value is smaller than the digit in DN, go to Stage 3; otherwise, go to Stage 4.

STAGE 3: Find the largest child node whose value is smaller than this digit. Traverse the rightmost path of this subtree (i.e., always jump to the child node that stores the highest number as compared to the numbers stored by its siblings) until a leaf node is reached. If the leaf node is "L", then the DN falls in the range associated with this lower bound. If the leaf node is "H", then the DN does not fall in any allowed range.

STAGE 4: Find the smallest child node whose value is larger than this digit. Traverse the leftmost path of this subtree (i.e., always jump to the child node that stores the lowest number as compared to the numbers stored by its siblings) until a leaf node is reached. If the leaf node is "L", then the DN does not fall in any allowed range. If the leaf node is "H", then the DN falls in the range-associated with this upper bound.

Figure 2:
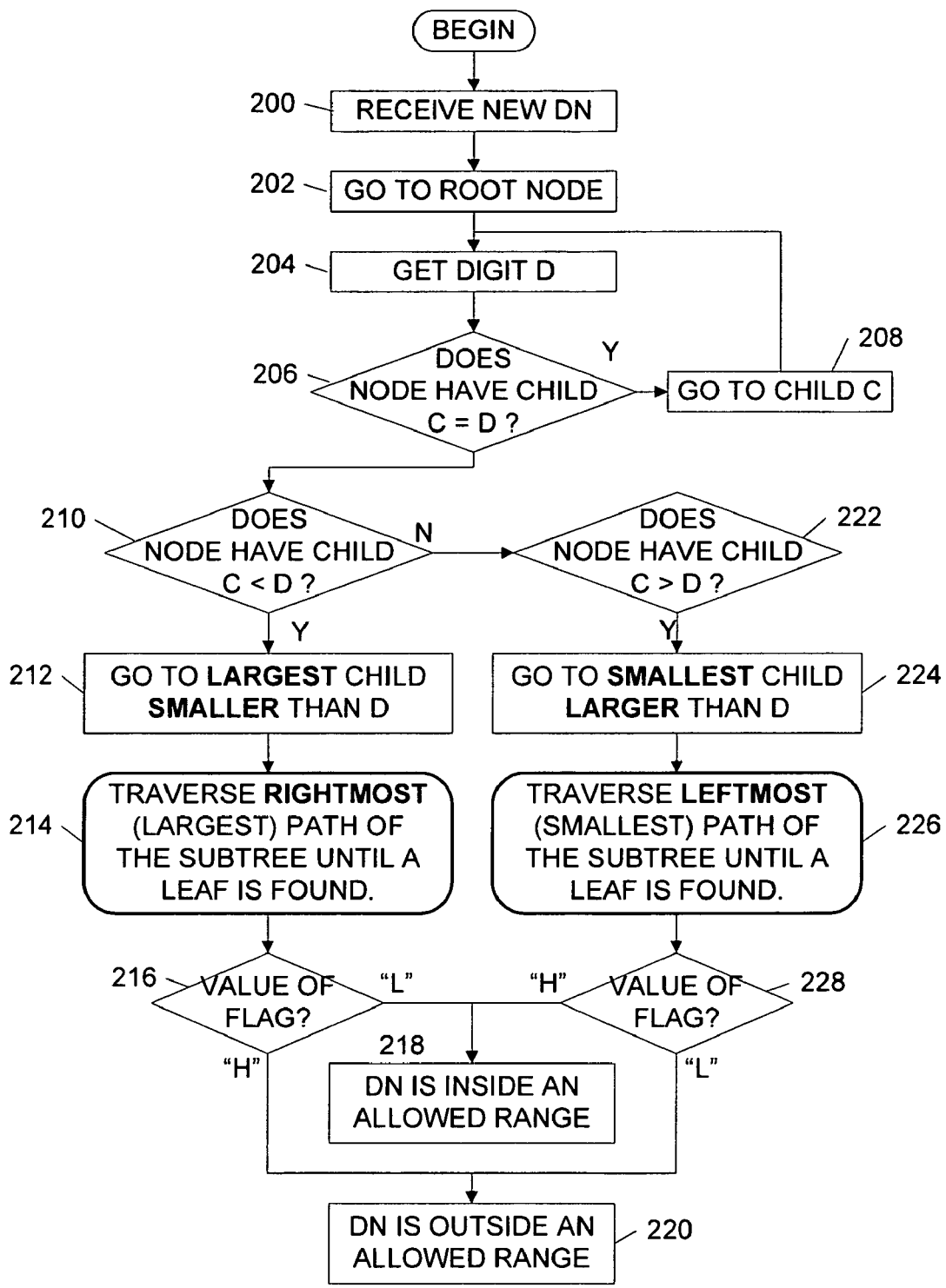
FIG. 2 is a block diagram illustrating an exemplary process for performing range-based screening using a range tree according to an embodiment of the subject matter described herein.

FIG. 2 is a flow chart illustrating an exemplary process for performing range-based DN screening using a range tree according to an embodiment of the subject matter described herein. In step 200, a new DN may be received by, for example, a switch. In step 202, analysis of the DN typically starts at the root node; that is, node pointer N points to NODE0. In step 204, a digit of the DN may be acquired for analysis. The first time that step 204 is performed, the first digit of the DN may be analyzed. The next time that step 204 is performed, the second digit of the DN may be analyzed, and so on.

In step 206, the children of the node pointed to by N may be analyzed to see if any of them store a value equal to the value of D. If a child node stores a value equal to the value of D, the process may go to step 208, in which N jumps to that child node. The process may then go back to step 204 to get the next digit. If there is no child node that stores a value equal to D, the process may move to step 210.

In step 210, it may be determined whether there is a child of the node pointed to by N that stores a value less than the value of D. If so, the process may move to step 212, in which node pointer N is moved to the child node storing the largest value that is smaller than the value of D. From here, the process may move to step 214, in which node pointer N may be repeatedly moved from its current node to whichever child of the current node contains the largest value, until a leaf node is reached. The process then may move to step 216, in which the value of a flag may be analyzed to determine whether the leaf node terminates a chain of nodes that represent an upper bound or a lower bound of an allowed range. In one embodiment, a flag value of "L" may indicate a lower bound of an allowed range while a flag value of "H" may indicate an upper bound of an allowed range. In embodiments that use flag nodes, the flag value may be the value stored in the leaf node. In embodiments that do not use flag nodes, the flag value may be a value of an attribute associated with the leaf node that also stores another value, such as a digit. If the flag="L", the process may move to step 218, and the DN may be determined to be within a valid range. If the flag="H", the process may move to step 220, and the DN may be determined to be outside a valid range.

However, if at step 210 it is determined there is no child that stores a value less than the value of D, the process may move to step 222, which may determine whether there is a child of the node pointed to by N that stores a value greater than the value of D. If so, the process may move to step 224, in which node pointer N may be moved to the child node storing the smallest value that is larger than the value of D. From here, the process may move to step 226, in which node pointer N may be repeatedly moved from its current node to whichever child of the current node contains the smallest value, until a leaf node is reached. The process then may move to step 228 in which the flag value is analyzed. If the flag="H", the process may move to step 218, and the DN may be determined to be within a valid range. If the flag="L", the process may move to step 220, and the DN may be determined to be outside a valid range.

Several examples of a range tree search are presented below. In Example 1, below, column "level" indicates which level within the tree is currently being traversed. Column D is the value of the digit of DN being analyzed. Column N contains the name of the node pointed to by the node pointer N; this node is referred to as the "current node". Column C contains the values stored by the children of the current node. The Action column lists actions taken, including tests and comparisons performed in steps of the flowchart shown in FIG. 2. In the first example, the DN received is (469) 666-5432.

Example 1

DN=(469) 666-5432

| level | D | N | C | Action(s) |
|---|---|---|---|---|
| root | 4 | NODE0 | 2, 4, 8, 9 | C=D? Yes, 4=4. Go to node B1. |
| 1 | 6 | B1 | 6 | C=D? Yes, 6=6. Go to node B2. |
| 2 | 9 | B2 | 9 | C=D? Yes, 9=9. Go to node B3. |
| 3 | 6 | B3 | 6 | C=D? Yes, 6=6. Go to node B4. |
| 4 | 6 | B4 | 6 | C=D? Yes, 6=6. Go to node B5. |
| 5 | 6 | B5 | 6 | C=D? Yes, 6=6. Go to node B6. |
| 6 | 5 | B6 | 2 | C=D? No. |
| | | | | C<D? Yes. Go to node with largest C that is less than D, (B7), and traverse rightmost (highest C value) path of subtree until a flag is reached. |
| 7 | 4 | B7 | 2 | Highest C value? 2. Go to node B8. |
| 8 | 3 | B8 | 2 | Highest C value? 2. Go to node B9. |
| 9 | 2 | B9 | 2 | Highest C value? 2. Go to node B10. |
| 10 | — | B10 | — | Highest C value? None. Go to flag. |
| flag | — | Bflag | — | Flag=L? Yes. DN is in range. |

The traversal of the range tree is as follows: in preparation for analysis of an incoming DN, node pointer N is set to NODE0. The actions taken at each tree level are described below:

At the root level: A DN, 4696665432, is received. D contains the first digit of the DN, 4. Node pointer N is set to NODE0. NODE0 has four children, A1, B1, C1, and D1, whose values, shown in column C, are 2, 4, 8, and 9, respectively. Node NODE0 is checked to see if any of its child nodes contains a value equal to the value stored in D (step 206, "C=D?"). Child node B1 matches (4=4), so B1 becomes the current node.

At level 1: D contains the second digit of the DN, 6. N now points to B1. B1 has one child node, B2, with a value of 6, shown in column C. Node B1 is checked to see if any of its child nodes contains a value equal to D (step 206, "C=D?"). Child node B2 matches (6=6), so B2 becomes the current node.

At level 2: D contains the third digit of the DN, 9. N points to B2. B2 has one child, B3, with a value of 9; C contains 9. Node B2 has a child whose value matches D (step 206, "C=D?"): node B3 (9=9), so B3 becomes the current node.

At level 3: D=6. N=B3, which has child B4, with a value of 6; C contains 6. Node B2 has a child whose value matches D (step 206, "C=D?"): node B4 (6=6), so B4 becomes the current node.

At level 4: D=6. N=B4, with one child B5; C contains 6. B5 has a value that matches D (step 206, "C=D?"), so B5 becomes the current node.

At level 5: D=6. N=B5, with one child B6; C contains 6. B5 has a value that matches D (step 206, "C=D?"), so B6 becomes the current node.

At level 6: D=5. N=B6, with one child B7; C contains 2. In this case, however, the current node B6 has no child nodes that contain a value equal to D (step 206, "C=D?"), so we look for a child node containing a value less than D (step 210, "C<D?"). Child node B7 meets this condition (2<5). The node with the largest value that is smaller than D becomes the current node (step 212), so B7 becomes the current node. From this point, the remainder of the tree is traversed by always going to the child node with the largest value until a leaf node is reached (step 214, "Highest C value?").

At level 7: The child of B7 with the largest C value (step 214, "Highest C value?") is B8, which becomes the current node.

At level 8: The child of B8 with the largest C value (step 214, "Highest C value?") is B9, which becomes the current node.

At level 9: The child of B9 with the largest C value (step 214, "Highest C value?") is B10, which becomes the current node.

At level 10: The child of B10 with the largest C value (step 214, "Highest C value?") is Bflag, which becomes the current node.

At the flag level: Bflag has no children (step 214, "Highest C value?"), indicating that Bflag is a leaf node. In one embodiment, the flag is the value of the leaf node—the flag node, in this case. In another embodiment, Node B10 would have no children and thus be the leaf node, in which case B10 may have a flag field or attribute that stores the flag value. The flag value is analyzed (step 216, "Flag=L?"), and DN is determined to be within a valid range (step 218).

Additional examples, including determination that a DN is not within a valid range, are shown below.

Example 2

DN=(972) 579-4813

| level | row | D | N | C | Action(s) |
|---|---|---|---|---|---|
| root | 1 | 9 | NODE0 | 2, 4, 8, 9 | C = D? Yes, 9 = 9. Go to node D1. |
| 1 | 2 | 7 | D1 | 7 | C = D? Yes, 7 = 7. Go to node D2. |
| 2 | 3 | 2 | D2 | 2 | C = D? Yes, 2 = 2. Go to node D3. |
| 3 | 4 | 5 | D3 | 4, 9 | C = D? No.<br>C < D? Yes, 4. Go to node with largest C that is less than D (G4), then traverse rightmost (highest C value) path of subtree until a flag is reached. |
| 4 | 5 | 7 | G4 | 4 | Highest C value? 4. Go to G5. |
| 5 | 6 | 9 | G5 | 4 | Highest C value? 4. Go to G6. |
| 6 | 7 | 4 | G6 | 1 | Highest C value? 1. Go to G7. |
| 7 | 8 | 8 | G7 | 1 | Highest C value? 1. Go to G8. |
| 8 | 9 | 1 | G8 | 1 | Highest C value? 1. Go to G9. |
| 9 | 10 | 3 | G9 | 1 | Highest C value? 1. Go to G10. |
| 10 | 11 | — | G10 | — | Highest C value? None. Go to flag. |
| flag | 12 | — | Gflag | — | Gflag = L? Yes. DN is in range. |

Example 3

DN=(213) 777-8888

| level | row | D | N | C | Action(s) |
|---|---|---|---|---|---|
| root | 1 | 2 | NODE0 | 2, 4, 8, 9 | C = D? Yes, 2 = 2. Go to node A1. |
| 1 | 2 | 1 | A1 | 1 | C = D? Yes, 1 = 1. Go to node A2. |
| 2 | 3 | 3 | A2 | 4 | C = D? No.<br>C < D? No.<br>C > D? Yes, 4. Go to node with smallest C that is greater than D (A3), then traverse leftmost (lowest C value) path of subtree until a flag is reached. |
| 3 | 4 | 7 | A3 | 2, 9 | Lowest C value? 2. Go to E4. |
| 4 | 5 | 7 | E4 | 4 | Highest C value? 4. Go to E5. |
| 5 | 6 | 7 | E5 | 4 | Highest C value? 4. Go to E6. |
| 6 | 7 | 8 | E6 | 1 | Highest C value? 1. Go to E7. |
| 7 | 8 | 8 | E7 | 1 | Highest C value? 1. Go to E8. |
| 8 | 9 | 8 | E8 | 1 | Highest C value? 1. Go to E9. |
| 9 | 10 | 8 | E9 | 1 | Highest C value? 1. Go to E10. |
| 10 | 11 | — | E10 | — | Highest C value? None. Go to flag. |
| flag | 12 | — | Eflag | — | Gflag = H? No. DN is out of range. |

Example 4

DN=(972) 999-3000

| level | row | D | N | C | Action(s) |
|---|---|---|---|---|---|
| root | 1 | 9 | NODE0 | 2, 4, 8, 9 | C = D? Yes, 9 = 9. Go to node D1. |
| 1 | 2 | 7 | D1 | 7 | C = D? Yes, 7 = 7. Go to node D2. |
| 2 | 3 | 2 | D2 | 2 | C = D? Yes, 2 = 2. Go to node D3 |
| 3 | 4 | 9 | D3 | 4, 9 | C = D? Yes, 9 = 9. Go to node H4. |
| 4 | 5 | 9 | H4 | 9 | C = D? Yes, 9 = 9. Go to node H5. |
| 5 | 6 | 9 | H5 | 9 | C = D? Yes, 9 = 9. Go to node H6 |
| 6 | 7 | 3 | H6 | 1, 4, 5 | C = D? No.<br>C < D? Yes, 1. Go to node with largest C that is less than D (J7), then traverse rightmost (highest C value) path of subtree until a flag is reached. |
| 7 | 8 | 0 | J7 | 9 | Highest C value? 9. Go to J8. |
| 8 | 9 | 0 | J8 | 9 | Highest C value? 9. Go to J9. |
| 9 | 10 | 0 | E9 | 9 | Highest C value? 9. Go to J10. |
| 10 | 11 | — | E10 | — | Highest C value? None. Go to flag. |
| flag | 12 | — | Eflag | — | Gflag = L? No. DN is out of range. |

Creating A Range Tree

According to another aspect, the subject matter described herein may include a process for creating a range tree.

Figure 3:
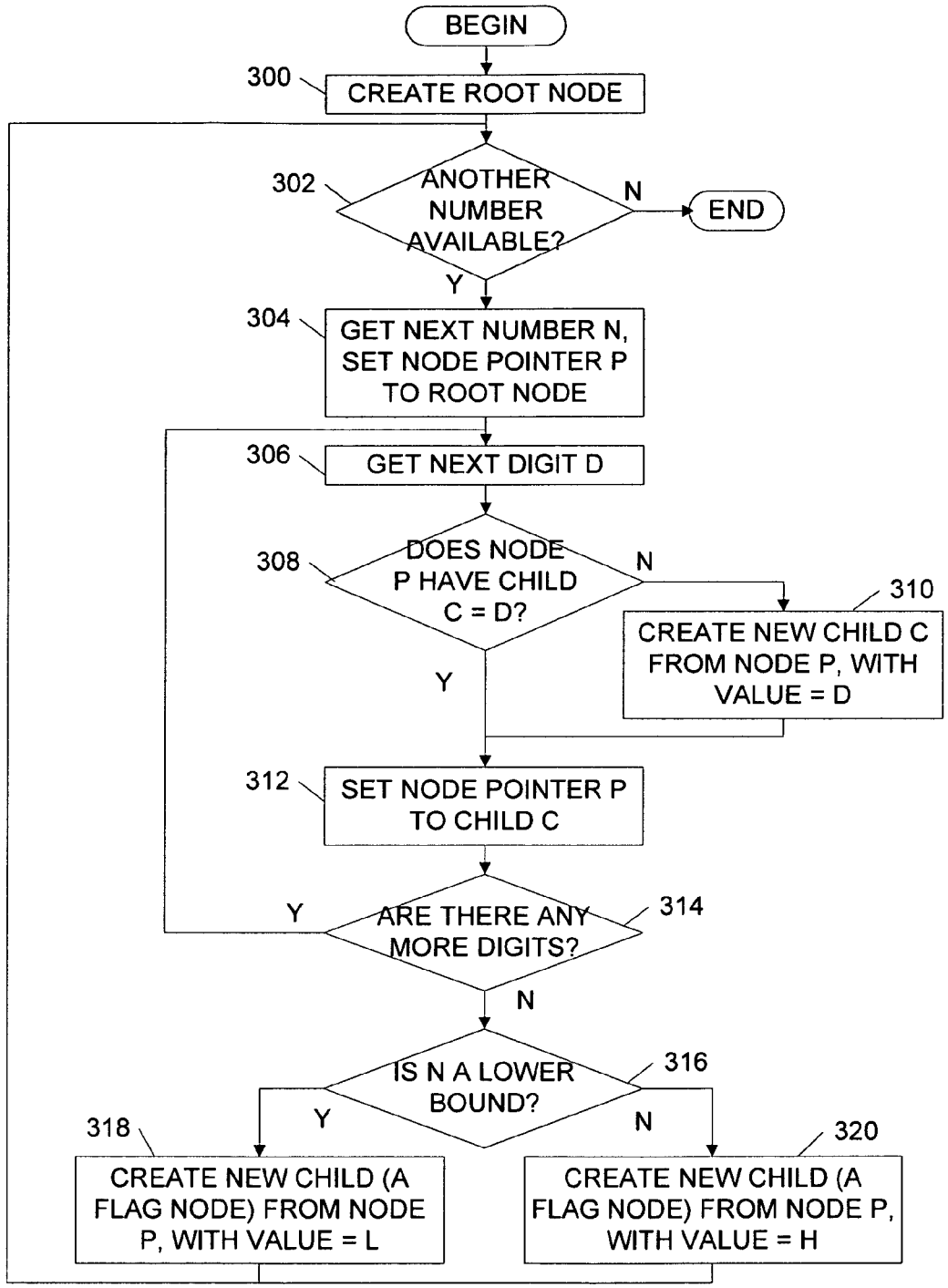
FIG. 3 is a block diagram illustrating an exemplary process for creating a range tree according to an embodiment of the subject matter described herein.

FIG. 3 is a flow chart illustrating an exemplary process for creating a range tree according to an embodiment of the subject matter described herein. For the purposes of illustration, it is assumed that the range tree will be built from one or more pairs of numbers, where each pair defines a numerical lower and upper bound of a valid range. In FIG. 3, "N" is one number from a pair of numbers, D is a digit of number N, and P is a node pointer. The node pointed to by node pointer P is called the "current node". For shorthand purposes, P may also be used to refer to the current node itself. C is a child node. For shorthand purposes, C may also be used to refer to the value that is stored by the child node.

In step 300, a root node is created. In step 302, it is determined whether another number is available for processing. If not, the process ends. If so, the process goes to step 304, in which the next number N is obtained, and node pointer P is set to the root node. In step 306, the next digit D of number N is obtained. In step 308, the current node is analyzed to determine whether the current node has any children whose value is equal to the value of D. If not, the process moves to step 310, which creates a child node C of the current node P and stores the value of D into the child node C. In step 312, P is moved to point to the child C (either pre-existing or just created) that contains the value D. In step 314, N is analyzed to determine whether there are any remaining digits to be processed; if so, the process returns to step 306, and if not, the process moves to step 316. In step 316, it is determined whether N is a lower bound; if so, the process moves to step 318, which creates a flag containing the value "L", and if not, the process moves to step 320, which creates a flag containing the value "H". In some embodiments, a new child C of node P will be created to hold the flag value, in which case the child node is a flag node. In other embodiments, a flag attribute will be associated with node P to store the flag value. The process then returns to step 302 to determine whether there are any more numbers to be processed. When all numbers have been processed, the tree creation process ends.

In some embodiments, a node may include a data structure that indicates the existence of child nodes that contain a particular value, thus obviating the need to jump to each child in order to determine the value stored by that child. In one exemplary embodiment, a node P may contain a bit field, where the value of bit[X] indicates the existence of a child node of P containing the value X. For example, setting bit[5] to 1 may indicate that P has a child node containing the value 5. A bit field containing binary values "1001101111" (bit[9] ~bit[0]) may indicate that P has a child node containing 0, a child node containing 1, a child node containing 2, a child node containing 3, a child node containing 5, a child node containing 6, and a child node containing 9. Such a bit field may effectuate fast tree traversal for two reasons: first, critical information about the child nodes is contained on the parent node; and second, determining the presence of a child with a value that matches D, or is the greatest child value less than D, or is the least child value greater than D, may be done with simple Boolean and shift operations.

Range Tree Maintenance

As used herein, the term "range tree maintenance" refers to the process of modifying a range tree to reflect changes in the allowed set of ranges that the range tree represents. A DN range tree may require maintenance in response to an event, such as receipt of a request for addition or deletion of DNs or a block of DNs. Insertion of a new DN or block of DNs typically involves a process nearly identical to the one used to create a range tree in FIG. 3, except that the new DN or block may be added to an existing root node, rather than creating a new root node; in other words, step 300 may be skipped.

Addition of a block of DNs may require addition of one or more new branches of a tree, and it may require deletion of some or all of one or more existing branches of a tree. For example, adding a new range of DNs may involve creating two new branches, to represent the upper and lower numerical range of the new block, particularly when the new range is non-contiguous with any existing range represented by the tree. Extension of an existing range may involve addition of one or more new branches and deletion of some or all of one or more existing branches. For example, extending the upper range of an existing block may involve adding a new branch to represent the new upper range and deleting some or all of the branch that represents the old upper range. Extension of both ends of an existing range may involve creation of new branches to represent the new upper and lower ranges and deletion of some or all of the branches that represent the old upper and lower ranges.

FIG. 4A through FIG. 4F illustrate exemplary tree maintenance in accordance with the subject matter described herein. FIG. 4A shows an example simplified range tree representing a numerical range of DNs allowed: 10,400~10,499. FIG. 4B shows the change that might be made to the range tree in response to a request to allow additional DNs in the range 10,000~10,399. Since these additional DNs are contiguous to an existing range, the request to add an additional range of DNs may be treated as a request to extend an existing range. As shown in FIG. 4B, a new branch is created to represent the new lower bound of the existing range, and the branch representing the old lower bound of the existing range was deleted. Alternatively, the additional range of DNs may be added by creating a new pair of branches representing the upper and lower bounds of the new range; in this case, no existing tree branches would have been removed. FIG. 4C is another example of adding an additional range of DNs, where the additional range is contiguous to an existing range. This effectively extends the upper limit of the existing range. In this case a new branch is added to represent the new upper limit of the existing range, and the branch representing the old upper limit is removed.

Deletion of a block of DNs may require removal of some or all of one or more branches of a tree. FIG. 4D shows another simplified range tree representing an allowed DN range of 20,000~39,999. For example, deletion of an entire block of DNs whose range is represented by two branches of the range tree may involve deletion of some or all of those two branches that represent the upper and lower range. On the other hand, deletion of an end portion of a range of DNs for example, may involve deletion of some or all of one branch, such as the branch representing the upper bound of the range, and creation of a new branch to represent the new upper bound of the range, as shown in FIG. 4E. Deletion of a block of DNs may require creation of additional branches in a tree. For example, deletion of a middle portion of a contiguous block of DNs may involve creating two new branches, one to represent the new upper range of the lower block, and another to represent the new lower range of the upper block, as shown in FIG. 4F. A contiguous block of DNs may be split without deleting any DNs within the range by an operation similar to that used to delete a middle portion of a contiguous block, but where the new upper range of the lower block is just one less than the new lower range of the upper block.

Operation

Figure 5:
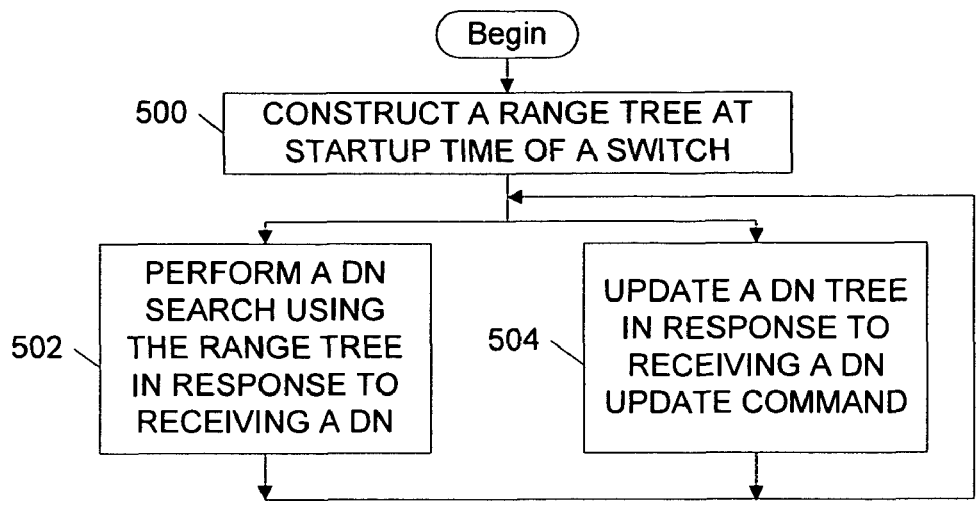
FIG. 5 is a flow chart illustrating an exemplary process for performing DN screening at a soft switch according to an embodiment of the subject matter described herein.

FIG. 5 is a flow chart illustrating an exemplary process for performing DN screening at a soft switch according to an embodiment of the subject matter described herein. In step 500 a range tree is created and stored in memory at the startup time of a soft switch. In step 502 a DN is received and analyzed against the range tree to determine whether the DN is within the block of DNs serviced by this soft switch. If the DN is not in the range of the DB of this switch (not provisioned at this switch), the DN is forwarded it to an appropriate switch. In step 504, upon receiving a request or command to update the range tree, perform maintenance/updating on the range tree in the memory. The updating operation may include adding a new DN, deleting an existing DN, or modifying an existing DN.

Figure 6:
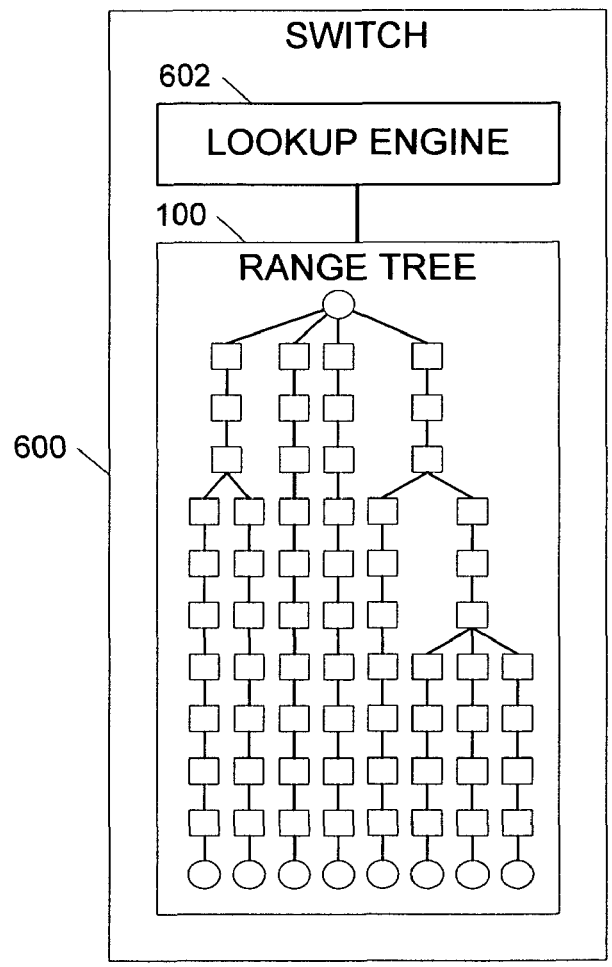
FIG. 6 is a block diagram illustrating an exemplary system using a range tree for DN screening according to an embodiment of the subject matter described herein.

FIG. 6 is a block diagram illustrating an exemplary system using a range tree for DN screening according to an embodiment of the subject matter described herein. In FIG. 6, switch 600 includes range tree 100 and a lookup engine 602 for determining, using range tree 100, whether an incoming DN is to be processed by switch 600.

It will be understood that various details of the invention may be changed without departing from the scope of the invention. Furthermore, the foregoing description is for the purpose of illustration only, and not for the purpose of limitation.

What is claimed is:

1. A method for determining that a telecommunications device directory number (DN) is within an allowed set of numerical ranges for processing by a telecommunications network node, the method comprising:
   (a) creating a range tree for representing an allowed set of numerical DN ranges for processing by a telecommunications network node, wherein each range is defined by a numerical upper and lower bound, and storing the range tree in a memory device of a telecommunications switch configured to switch calls based on DNs;
   (b) receiving, by the telecommunications switch, a telecommunications device DN to be analyzed;
   (c) traversing, by the telecommunications switch, the range tree from a root node of the tree, based on analyzing each digit of the DN, until a leaf node is reached; and
   (d) determining, by the telecommunications switch and based on an attribute associated with the leaf node reached, whether the DN is within the allowed set of ranges.

2. The method of claim 1 wherein the allowed set of numerical DN ranges represents a set of DNs that are processed by the telecommunications network node and wherein DNs not within the allowed set are not processed by the telecommunications switch.

3. The method of claim 1 wherein the telecommunications switch comprises a soft switch.

4. The method of claim 1 wherein the telecommunications switch comprises a media gateway controller.

5. The method of claim 1 wherein traversing the range tree comprises:
   (a) for each digit D of the DN, starting from a most significant digit of the DN, determining whether there exists a child node C in the range tree that contains a value of the digit D, and in response to a determination that a child node C in the range tree exists that has the value of the digit D, jumping to the child node C;
   (b) in response to a determination that no child node in the range tree contains the value of the digit D, determining whether there exists a child node in the range tree that contains a value smaller than the value of digit D, and in response to a determination that a child node exists that contains a value smaller than the value of the digit D, starting from the child node containing the largest value that is smaller than the value of the digit D, traversing a branch in the range tree representing the largest number that is smaller than the DN until a leaf node is reached; and
   (c) in response to a determination that no child node exists in the range tree that contains a value smaller than the value of the digit D, determining whether there exists a child node in the range tree that contains a value larger than the value of the digit D, and in response to a determination that a child node exists in the range tree that contains a value larger than the value of the digit D, starting from the child node containing the smallest value that is larger than the value of the digit D, traversing a branch in the range tree representing the smallest number that is larger than the DN until a leaf node is reached.

6. The method of claim 1 wherein the digits of the DN comprise an ordered set of symbols.

7. The method of claim 1 comprising modifying the range tree to reflect a change in allowed ranges.

8. The method of claim 7 wherein modifying the range tree comprises modifying the range tree in response to a request for a change in allowed ranges.

9. The method of claim 7 wherein modifying the range tree includes creating at least a portion of a branch of the range tree.

10. The method of claim 7 wherein modifying the range tree includes deleting at least a portion of a branch of the range tree.

11. A method for creating a range tree of telecommunication device directory numbers, the method comprising:
    creating a root node and encoding at least one pair of numbers representing a numeric upper and lower bound of an allowed directory number range, wherein encoding each number N of the pair of numbers includes:
    (a) setting a node pointer P to point to the root node; and
    (b) for each digit D of N, starting from a most significant digit of N:
       (i) determining whether there exists a node C that is a child of the node pointed to by P and that contains a value of the digit D, and responsive to determining that such a node C does not exist, creating a node C that is a child of the node pointed to by P and that contains the value of the digit D; and
       (ii) moving P to point to the node C;
    (c) associating with the node pointed to by P an attribute for indicating whether the number N represents an upper bound or a lower bound of an allowed directory number range: storing, in a telecommunications switch, a range tree created according to steps (a) through (c); and
    performing, by the telecommunications switch, lookups in the range tree for incoming directory numbers.

12. A range tree embodied in a non-transitory computer-readable medium for representing an allowed set of telecommunication device directory number (DN) ranges, the range tree comprising:
    (a) a media gateway controller having a memory;
    (b) a root node stored in the memory of the media gateway controller; and
    (c) a plurality of nodes stored in the memory of the media gateway controller and subtending from the root node for representing digits of telecommunications device directory numbers, the nodes being grouped to represent ranges of telecommunications networks directory numbers and for each range, the nodes represent a number comprising a lower bound for the range and a number comprising an upper bound for the range.

13. A system comprising a range tree and a media gateway controller having a memory, the range tree being embodied in the memory and representing an allowed set of telecommunication device directory number DN ranges, the range tree comprising a root node and a plurality of nodes subtending from the root node for representing digits of telecommunications device directory numbers, the nodes being grouped to represent ranges of telecommunications networks directory numbers and for each range, the nodes represent a number comprising a lower bound for the range and a number comprising an upper bound for the range, wherein the plurality of nodes represents the digits of each number, wherein for each number:

(a) the node representing a most significant digit of the number is a child of the root node;
(b) each node representing a digit that is not the most significant digit of the number is a child of the node representing a next more significant digit of the number;
(c) an attribute for indicating whether the number represents an upper or lower bound is associated with the node representing a least significant digit of the number, wherein the media gateway controller performs lookups for directory numbers using the range tree.

14. The range tree of claim 13 wherein the attribute for indicating whether the number represents an upper or lower bound is included in a child node of the node representing the least significant digit of the number.

15. The range tree of claim 13 wherein the attribute for indicating whether the number represents an upper or lower bound is included in a data structure of the node representing the least significant digit of the number.

16. The range tree of claim 13 wherein each node includes a bit-field wherein a value of bit N of the bit-field indicates the existence of a child node containing the value N.

17. A system for determining that a telecommunication device directory number is within an allowed set of ranges, the system comprising:

a media gateway controller for receiving a call including a directory number (DN), the media gateway controller including:

(a) a range tree embodied in a computer readable medium of the media gateway controller, the range tree including root node and a plurality of nodes subtending from the root node for representing digits of telecommunications device directory numbers, the nodes being grouped to represent ranges to telecommunications networks directory numbers and for reach range, the nodes represent a number comprising a lower bound for the range and a number comprising an upper bound for the range; and
(b) a lookup engine in the media gateway controller for performing a lookup to determine whether the DN is within an allowed range;

wherein the switch processes the call based on results of the determination.

18. The system of claim 17 wherein the switch comprises a soft switch.

19. The system of claim 17 wherein the switch comprises a public switched telephone network (PSTN) switch.

20. A computer program product comprising computer executable instructions embodied in a non-transitory computer readable medium for performing steps comprising:

(a) creating a range tree for representing an allowed set of numerical DN ranges, wherein each range is defined by a numerical upper and lower bound, and storing the range tree in a memory device of a media gateway controller;
(b) receiving, by the media gateway controller, a telecommunications device DN to be analyzed;
(c) traversing, by the media gateway controller, the range tree from a root node of the tree, based on analyzing each digit of the DN, until a leaf node is reached; and
(d) determining, by the media gateway controller, based on an attribute associated with the leaf node reached, whether the DN is within the allowed set of ranges.

* * * * *